United States Patent [19]
Parker et al.

[11] Patent Number: 4,946,486
[45] Date of Patent: Aug. 7, 1990

[54] SCRUBBER SYSTEM FOR THE REMOVAL OF CONTAMINANTS FROM A FLUID STREAM

[75] Inventors: Thomas H. Parker, Marathon, N.Y.; Virgil J. Flanigan, Rolla, Mo.

[73] Assignee: H. E. Technology, Ltd., Marathon, N.Y.

[21] Appl. No.: 257,661

[22] Filed: Oct. 14, 1988

[51] Int. Cl.$^5$ ............................................. B01D 45/00
[52] U.S. Cl. ......................................... 55/479; 55/512; 48/197 R
[58] Field of Search ...................... 55/99, 90, 79, 259, 55/479, 474, 512; 201/4, 25, 28; 48/209, 197 R

[56] References Cited

U.S. PATENT DOCUMENTS

| | | | |
|---|---|---|---|
| 1,570,869 | 1/1926 | Thomson et al. | 55/479 |
| 2,653,675 | 9/1953 | Lynch | 55/479 |
| 2,837,399 | 6/1958 | Gollmar et al. | 23/3 |
| 3,731,910 | 5/1973 | Butler | 55/267 |
| 3,926,587 | 12/1975 | Squires | 55/479 |
| 3,967,941 | 7/1976 | Terao | 55/222 |
| 4,012,210 | 3/1977 | Morris | 55/479 |
| 4,035,170 | 7/1977 | Lear, Jr. et al. | 55/267 |
| 4,214,878 | 7/1980 | Weiss | 55/96 |
| 4,246,012 | 1/1981 | Khlopkov et al. | 55/479 |
| 4,256,045 | 3/1981 | Johnson, Jr. | 110/345 |
| 4,261,705 | 3/1981 | Li | 48/86 R |
| 4,290,782 | 9/1981 | Johnson | 55/60 |
| 4,290,786 | 9/1981 | Schuff | 55/107 |
| 4,530,702 | 7/1985 | Fetters et al. | 48/209 |

FOREIGN PATENT DOCUMENTS

| | | | |
|---|---|---|---|
| 114711 | 7/1983 | Japan | 55/479 |
| 18414 | 1/1986 | Japan | 55/512 |

Primary Examiner—Bernard Nozick
Attorney, Agent, or Firm—Martin LuKacher

[57] ABSTRACT

A scrubber which dries and removes contaminants from a fluid stream (a gas-liquid stream) using as a media, particulate material which can be char obtained from a gasifier, the scrubber system processing the gas and cooling liquid combined with the gas which is obtained by reactions in the gasifier. The media is fed in a continuous stream forming a downward moving column in counterflow relationship with the gas. The gas flows upward thru the particulate media and is dried and cleaned as it contacts the media. The flow relationship is such that the cleanest and dryest media and the cleanest gas contact each other. The column of media continues downward entering a liquid scrubbing section where it is disposed below the level of the liquid. There the contaminated liquid stream, passes through the media in counterflow relationship being cleaned as it contacts the media. Both the gas and liquid components of the stream are scrubbed prior to discharge of the spent media. The spent media may be recirculated to the gasifier for further gasification.

21 Claims, 16 Drawing Sheets

SCRUBBER SYSTEM FOR THE REMOVAL OF CONTAMINANTS FROM A FLUID STREAM

DESCRIPTION

The present invention relates to scrubber systems for removing contaminants from a fluid stream, and particularly from a combined gas-liquid stream.

The invention is especially suitable for use in a system including a gasifier, gas from which is separated from char produced by the gasifier; the char being used in a scrubber external to the gasifier. The gas may be combined with cooling water and applied to the scrubber wherein the char is used to dry and filter (scrub) the gas and liquid components. The spent char may be recirculated to the gasifier and subjected to further gasification reactions therein. The gasifier with which a scrubber system in accordance with the invention is especially adapted to be used is described in a patent application filed by Thomas H. Parker and Virgil J. Flanigan as inventors; the application being entitled "High Efficiency Gasifier With Recycle System". The patent application was filed in the U.S. Patent and Trademark Office on June 28, 1988 and assigned Ser. No. 212,519. Features of the invention are adapted for use in scrubbing systems for the removal of contaminants from any fluid stream, and especially a gas-liquid stream. The fluid stream to be scrubbed may come from other gasifiers, for example the gasifier described in U.S. Pat. No. 4,530,702, other or sources as may produce carbonization gases, exhaust gases or flue gases.

Various apparatus have been described for filtering contaminants mechanically and/or by chemical reaction processes thereby removing the contaminants. The following patents provide a general technological background with respect to such apparatus: Thomson et al, U.S. Pat. No. 1,570,869, Jan. 26, 1926; Gollmar et al, U.S. Pat. No. 2,837,399, June 3, 1958; Terao, U.S. Pat. No. 3,967,941, July 6, 1976; Morris, U.S. Pat. No. 4,012,210, Mar. 15, 1977; Lear, Jr. et al, U.S. Pat. No. 4,035,170, July 12, 1977; Weiss, U.S. Pat. No. 4,214,878, July 29, 1980; Johnson Jr., U.S. Pat. No. 4,256,045, Mar. 17, 1981; Li, U.S. Pat. No. 4,261,705, Apr. 14, 1981; Johnson, U.S. Pat. No. 4,290,782, Sept. 22, 1981; and Schuff, U.S. Pat. No. 4,290,786, Sept. 22, 1981.

The present invention improves scrubbing system technology by providing the following features:

(a) Arrangement or stacking of counterflowing fluid streams to be scrubbed and scrubbing media in such relationship that the cleanest scrubbing media contacts the cleanest fluid in the scrubber thereby allowing the fluid to be cleaned by cleaner and cleaner media as it flows from an inlet to an outlet of the scrubbing system;

(b) Scrubbing of gas-liquid fluid streams by providing a separate region of the media under the level of the liquid through which the liquid passes in counterflowing relationship with the scrubbing media and is scrubbed;

(c) Utilization of char from a gasifier as the scrubbing media in the scrubbing system and enabling the spent char which has picked up the contaminants to be recirculated through the gasifier for gasification of the contaminants and further gasification of the carbonaceous components of the char (char being the combination of carbon and ash);

(d) Utilization of a scrubbing media for the scrubbing of a gas-liquid fluid stream which may have a specific gravity greater or less than the liquid (e.g. where the liquid is water to be either heavier or lighter than water);

(e) Utilization of a column of scrubbing media wherein the gas and liquid are stripped of contaminants as they pass through upper and lower portions of the column; the media being fed by auger into a top, magazine or storage area of the column and then enabled to move downward by gravity into a gas scrubbing section and then continuing downward into a lower liquid scrubbing section where it enters a system of augers which enables the downward flow of the media in a direction inwardly of the column to a center discharge auger;

(f) Utilization of a central opening or passage through a column of scrubbing media which has an inlet for the fluid stream to be cleaned at the top thereof and an outlet spaced from the bottom of the column so that a gaseous component of the fluid flows upwardly in a direction opposite to the flow of the media in the column to a discharge region (e.g. a plenum) in communication with the column in the vicinity of the upper end thereof whereby the cleanest gas contacts the cleanest media as the media and gas progagate with respect to each other in counterflowing relationship; and (g) Utilization of a tank which holds the lower end of a column of the media under the level of the liquid in the tank through which column the liquid passes and is scrubbed and stripped of contaminants as in a plurality of vertically spaced, separate sections in the tank which are in communication at opposite ends thereof and through which the media is circulated from the bottom of the column to a discharge outlet for the spent media; the flow path of the liquid through the sections being such that the cleanest liquid contacts the cleanest media in the tank and wherein the media is circulated by arrays of augers in each section of the plurality of sections.

Briefly described, a system for scrubbing fluid or a combined fluid gas stream from a gasifier (the fluid for example being water combined with the gas from the gasifier) utilizes means for separating the gas and a scrubbing media (as may be provided by char from the gasifier). Means are provided for scrubbing the gas with the media. The scrubbing means has a media inlet and a spent media outlet and a gas inlet and a clean gas outlet. Means are provided for delivering the gas and the scrubbing media from the separating means to the scrubbing means. The scrubbing means establishes a flow of the media from the media inlet to the spent media outlet and a flow of the gas from the gas inlet to the clean gas outlet so that the gas and media are in counterflowing relationship, which relationship preferably enables the cleanest gas to contact the cleanest media so as to be progressively stripped of contaminants by cleaner and cleaner media. When liquid is combined with the gas before it is delivered to the gas inlet of the scrubbing means, the scrubbing means provides a path through the media under the level of the liquid where the liquid contacts the media and is scrubbed. This path being separate from the path in the media where the gas is scrubbed.

The foregoing and and other features, objects and advantages of the invention, as well as presently preferred embodiments and the best mode of operation of the invention, will become more apparent from a reading of the following description in connection with the accompanying drawings wherein.

Figure 1:
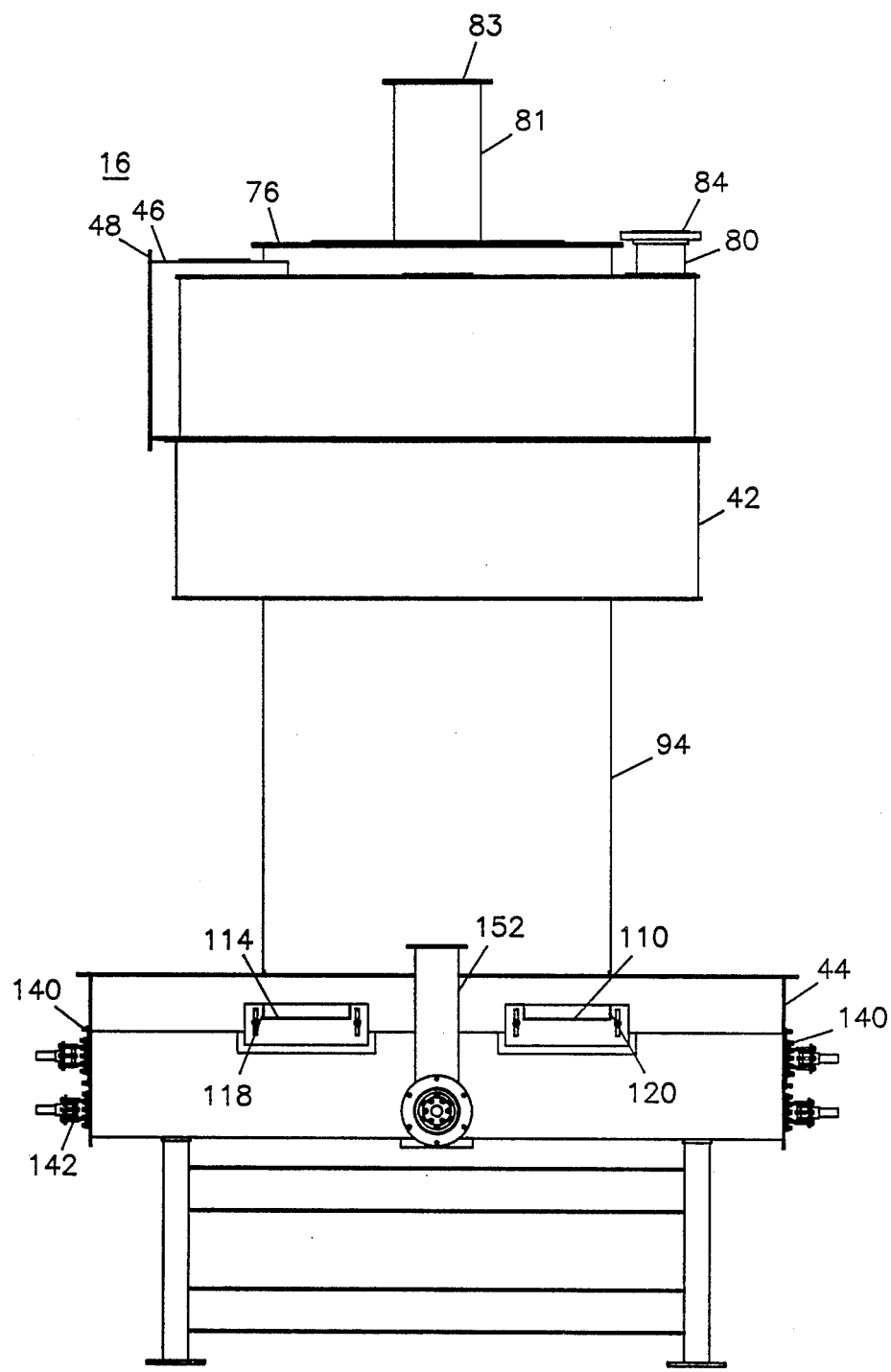
FIG. 1 is a view in elevation of a scrubbing system in accordance with a first embodiment of the invention.
Figure 2:
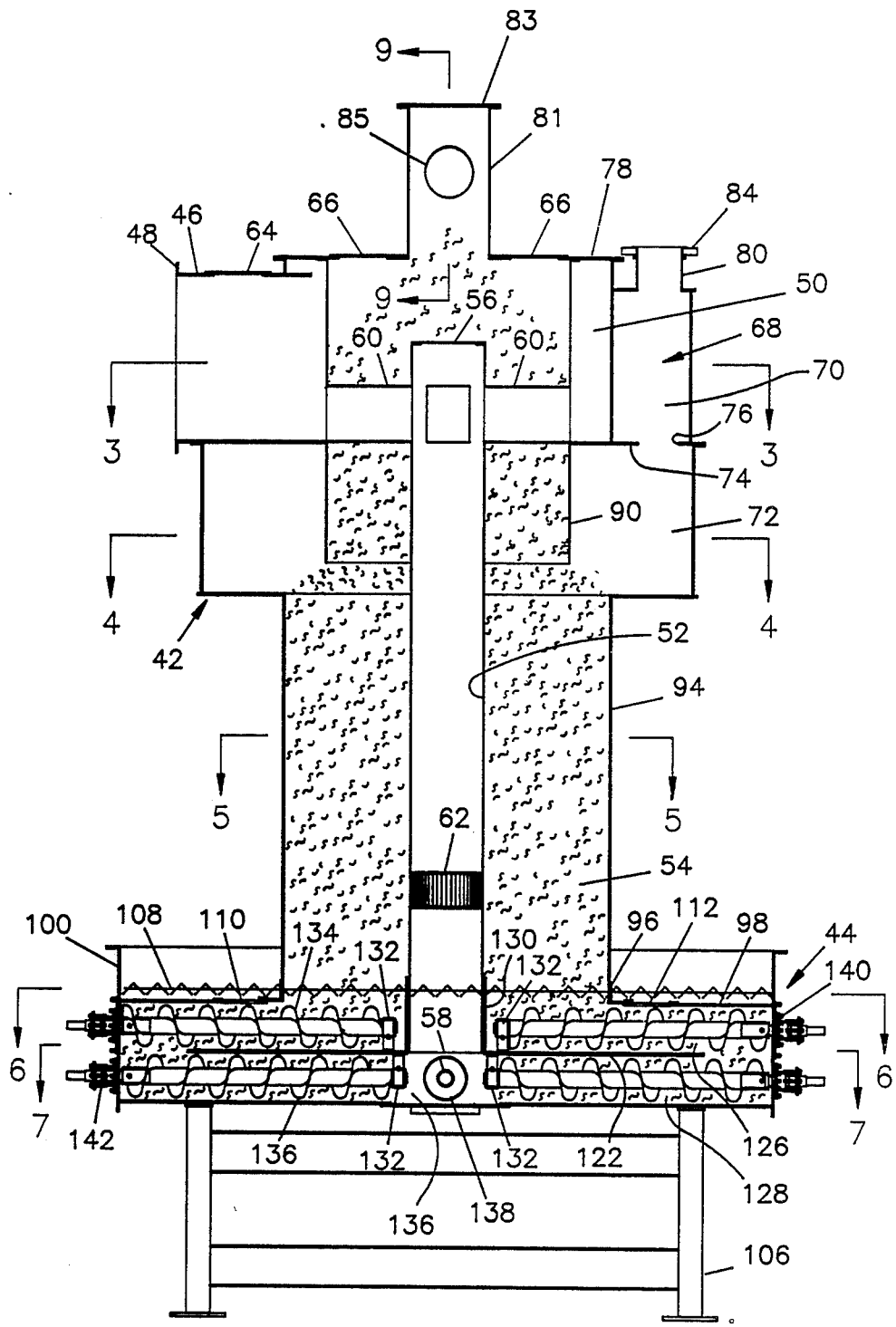
FIG. 2 is a diagramatic sectional view of the system shown in FIG. 1, taken along the line 2—2 in FIG. 2A.
Figure 8:
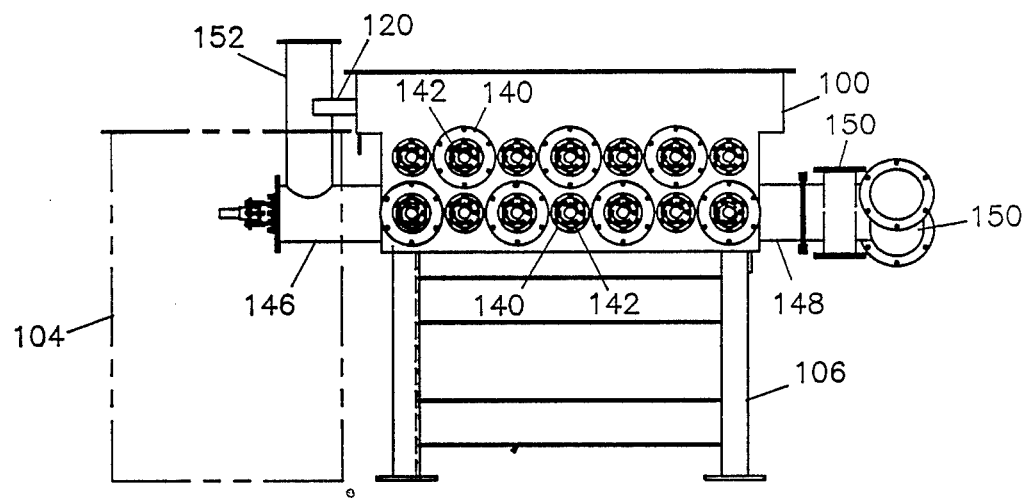
Figure 9:
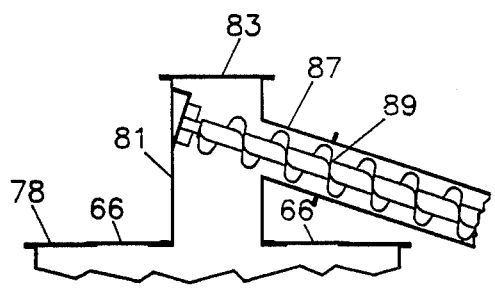
Figure 10:
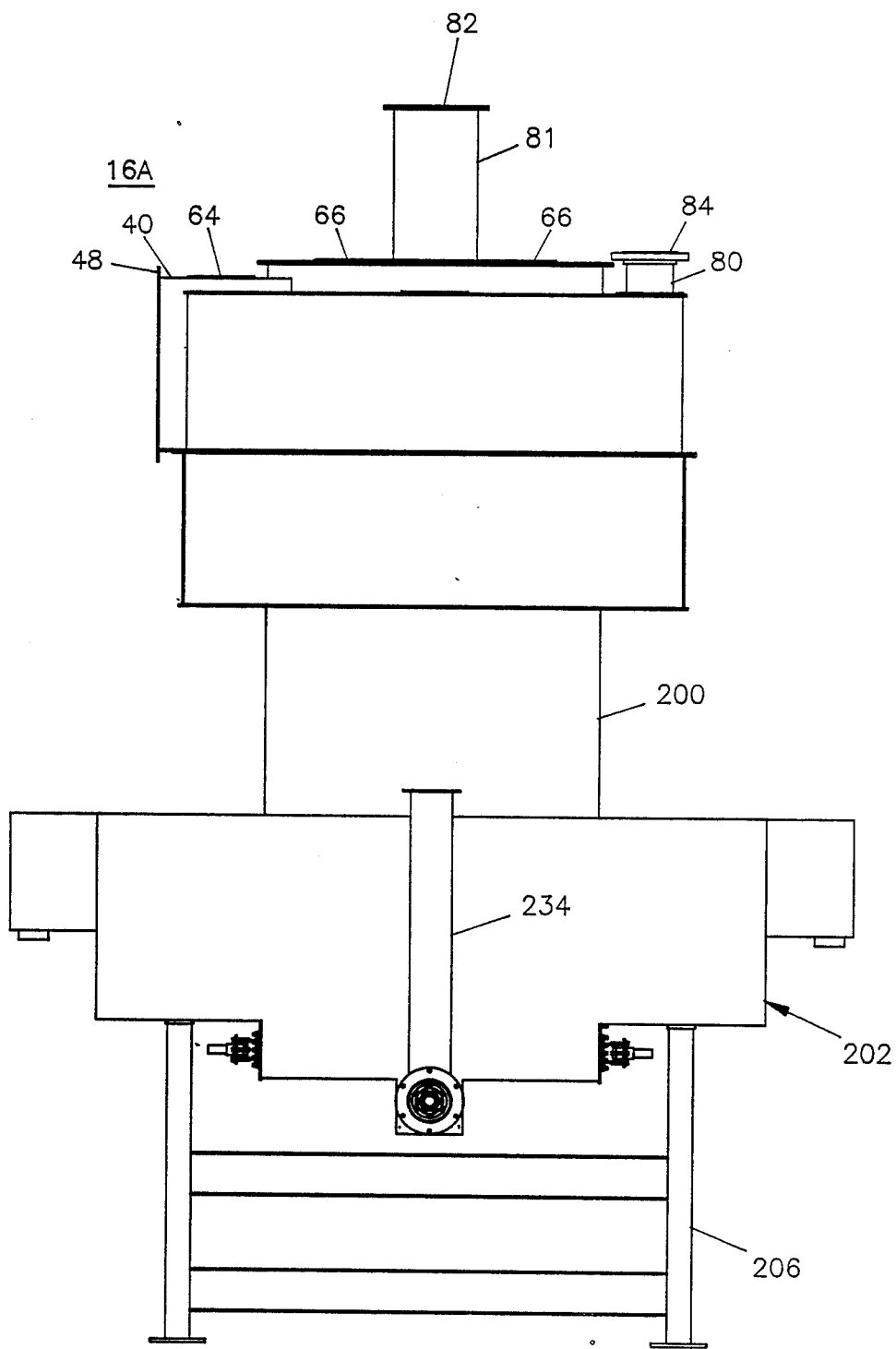
Figure 10A:
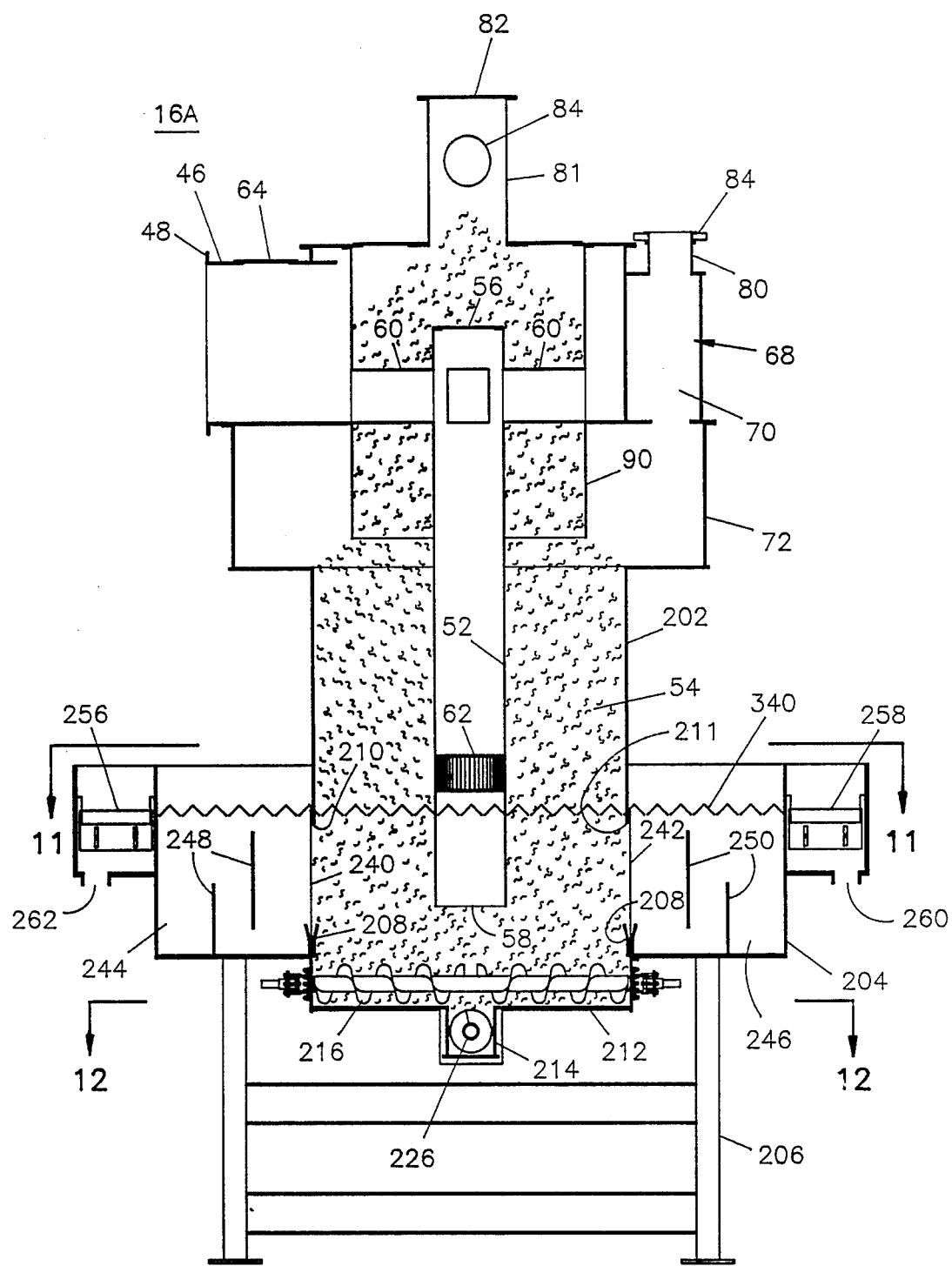
Figure 10B:
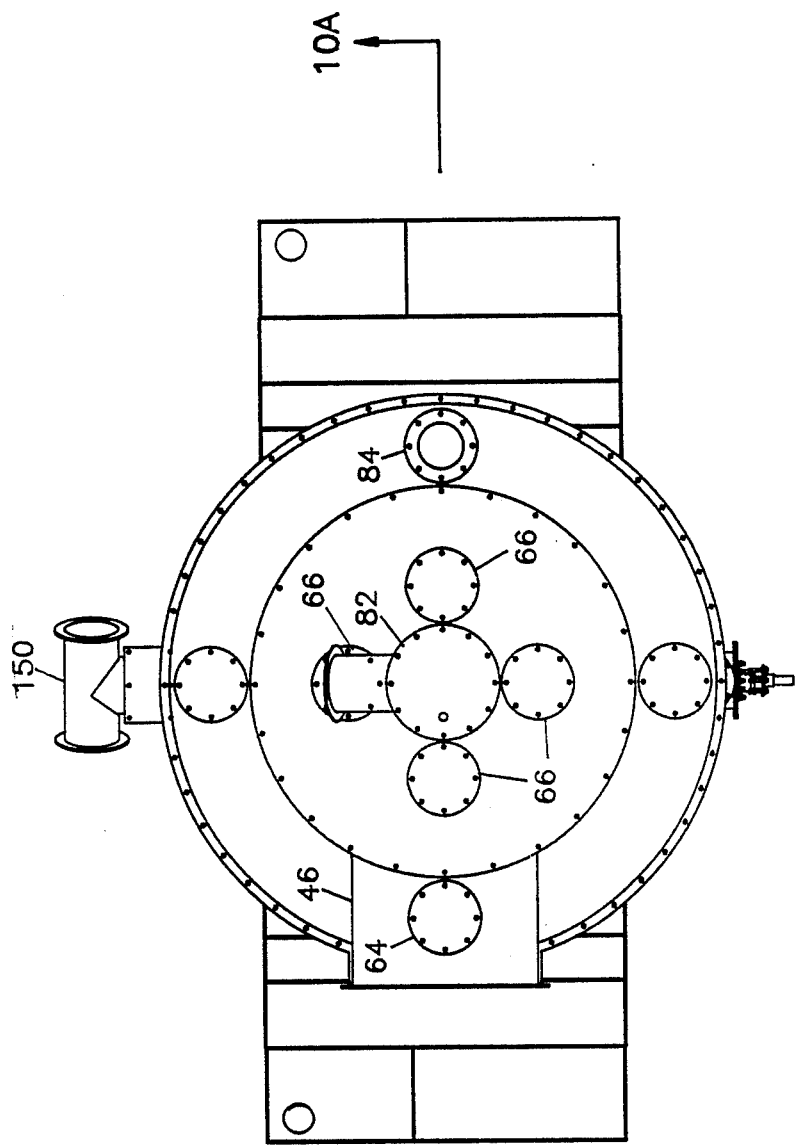
Figure 11:
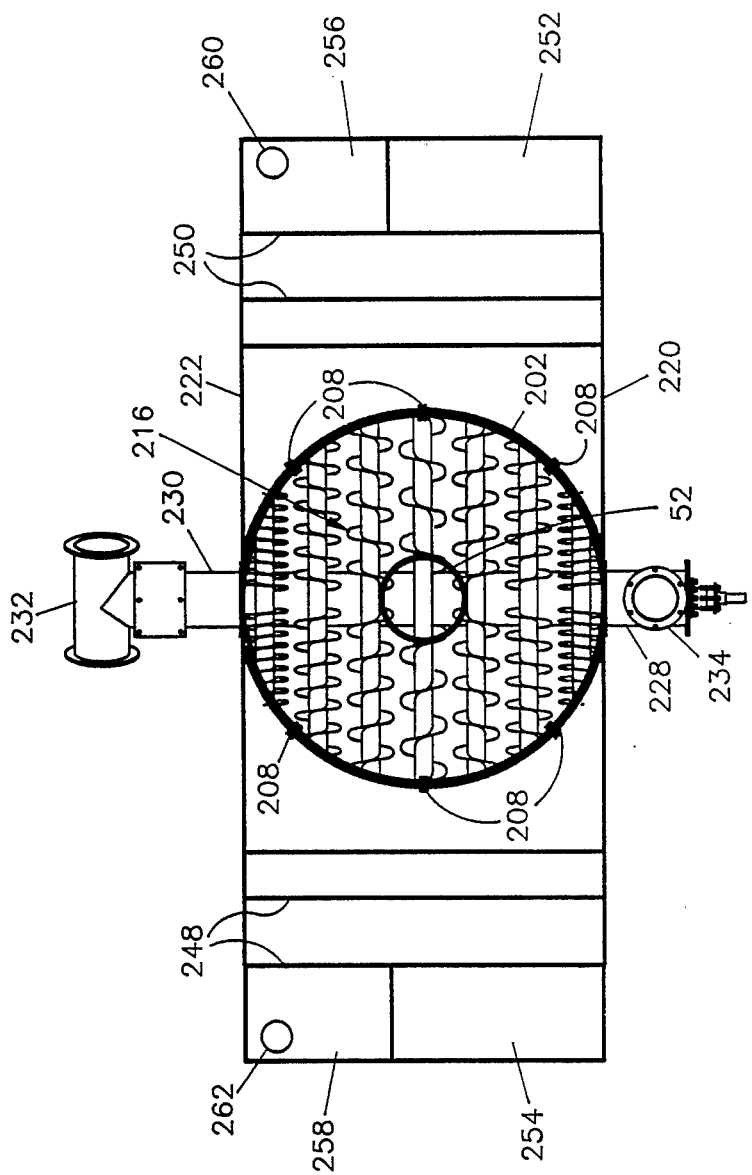
Figure 12:
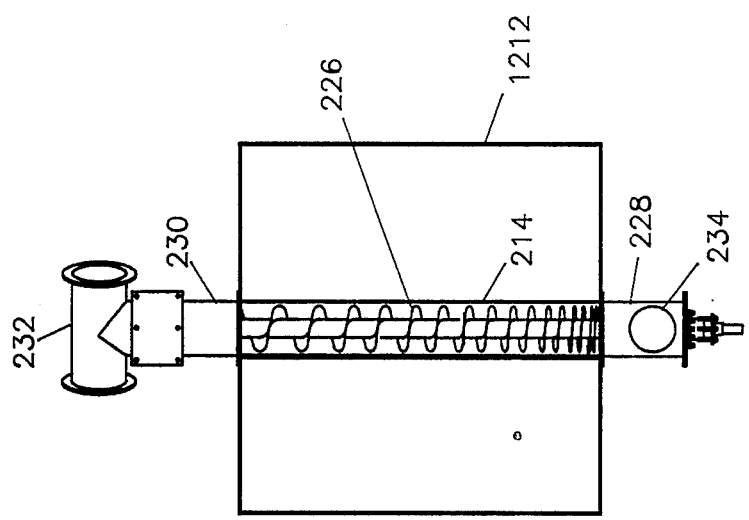
Figure 13:
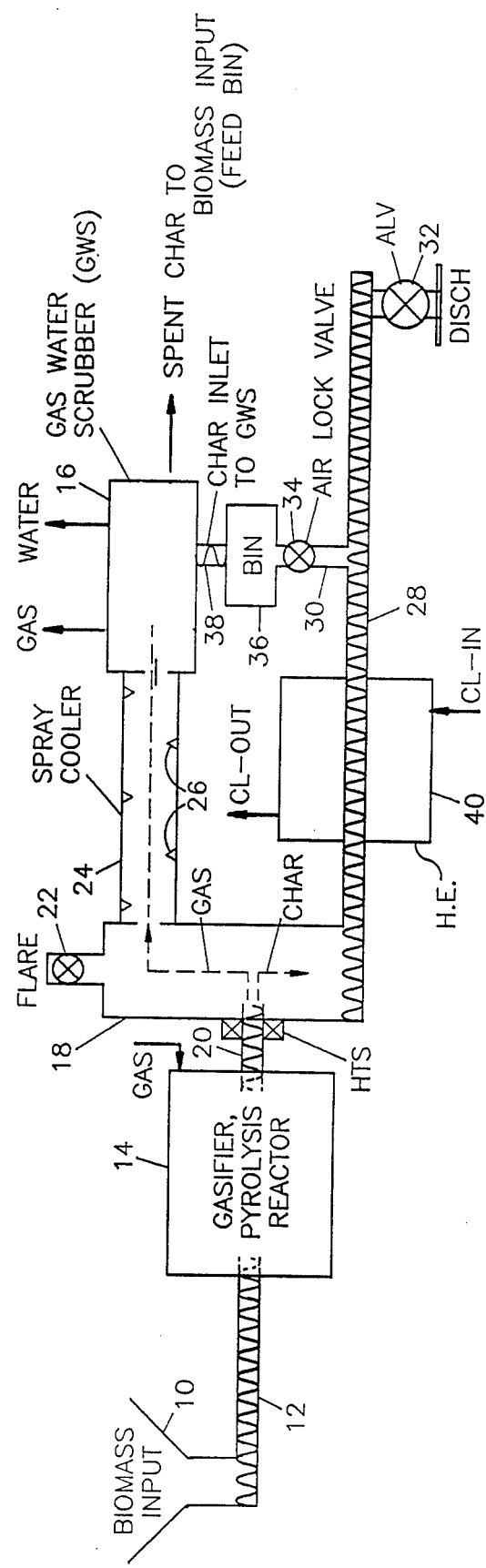

FIGS. 3, 4, 5, 6 and 7 and sectional views taken along the lines 3—3, 4—4, 5—5, 6—6, and 7—7 in FIG. 2, respectively;

FIG. 8 is a side view, taken from the right as shown in FIG. 1, of the bottom or tank portion of the systems shown in FIGS. 1 through 7;

FIG. 9 is a diagramatic sectional view taken along the line 9—9 in FIG. 2;

FIG. 10 is a view in elevation of a scrubbing system in accordance with another embodiment of the invention;

FIG. 10A is a diagramatic sectional view of the system shown in FIG. 10A, taken along the line 10A—10A in FIG. 10B;

FIG. 10B is a plan view of the system shown in FIG. 10;

FIGS. 11 and 12 are sectional views taken along the line 11—11 and 12—12 in FIG. 10A, respectively; and FIG. 13 is a schematic diagram of a biomass conversion system utilizing a gasifier and a scrubbing system which may be of the type illustrated in the preceding figures.

Referring first to FIG. 13. There shown a gasifier and scrubber system which is designed to produce gas which is burnable and may be used for heating, combustion and industrial processes and even for operating internal combustion engines. The gas is a medium heating value (BTU) gas resulting from the gasification of a biomass. A suitable biomass is, for example oat husks. Other biomass including sawdust, sewerage sludge, ground rubber and shredded garbage which may be used and gasified in the system. Biomass such as oat husks or other agricultural waste is especially suitable since it results in a char which is particulate in form (granular).

The feedstock input is fed into a bin or hopper 10 and conveyed, as by an auger 12, to the gasifier 14. The gasifier is preferably a closed system which executes a pyrolysis reaction on the feedstock and is referred to as a pyrolysis reactor. This reactor is preferably of the type described in the above-identified patent application which names Thomas H. Parker and Virgil J. Flanigan as the inventors. A portion of the gas which is produced in the gasifier after scrubbing in a gas-water scrubber (GWS) system 16 is fed back to the gasifier 14 and used to provide heat to support the pyrolysis reaction.

The char and gas (char being a combination of carbon and ash) is fed from the output end of the gasifier 14 through a high temperature seal (HTS) into a gas-char separator 18. The HTS seals the reactor. The char may be delivered by another auger 20. The gas rises and excess gas may be burned by opening a flare valve 22. There are two separate streams, one of gas and the other of char. The gas is very hot (e.g. 1,200° to 1,300° F.) and is cooled by a spray cooler 24 which has spray nozzles 26 around the inner periphery thereof. The liquid used is preferably water. The water condenses tar in the gas and is delivered together with the gas to the inlet of the gas-water scrubber GWS 16. The spray cooler 24 may be conventional and is preferably mounted directly on the scrubber. The char is used as the scrubbing media in the GWS 16.

The char is also at high temperature and may even be slightly hotter than the gas. The char is delivered by an auger 28 in a delivery pipe which extends through a "T" to a discharge. Discharge is through an airlock value (ALV) 32. Another airlock valve 34 in a pipe, which extends downwardly or may extend upwardly and is equipped with delivery devices such as augers, feeds a portion of the char into a collection bin 36. The char is conveyed through another pipe having an auger 38 (see also FIG. 9) to the char inlet of the GWS 16. The char is cooled before delivery to the scrubber and before discharge by a heat exchanger (HE) 40 which may be a jacket through which cooling liquid (CL) (e.g. water) is circulated.

The scrubber provides gas which has been stripped of tar, much of the water and water vapor is absorbed (like a blotter) or adsorbed on the surfaces of the particulate char in the scrubber. In addition, the ash content of the char which with most feedstocks will by alkaline neutralizes acidic components ($H_2SO_4$, HCL) found in the fluid stream. Water which has also been stripped of tar is also provided from the scrubber 16. The gas is used for the purposes discussed above and a portion thereof is fed back to the reactor 14 to sustain the reaction and continue gasification. On startup, an auxiliary source of gas (propane) may be used to initiate the reaction. The scrubber also has a spent char outlet where the spent char that has circulated through the scrubber and has picked up the tar and other contaminants is removed. This spent char is preferably recirculated with the feedstock input and is provided to the hopper (or other feed bin) for the reactor 14. Upon recirculation through the reactor 14 hydrocarbon contaminants, such as toxins which are stripped in the scrubber, are again subjected to a pyrolysis reaction and turned into hydrogen and carbon monoxide (Gas—a useful product) upon recycling. The system operates continuously as a gas producer. The water from the scrubber may be recycled through the spray cooler and even used as cooling liquid (CL) in the heat exchanger.

Referring next to FIGS. 1–9 there is shown a scrubber system which may be used as the GWS 16 in the system shown in FIG. 13. This system is especially suitable when the input results in char which is lighter than water. Then the char is retained below water level while stripping contaminants from the water in the gas-water stream which is applied to the scrubber. It will be understood that other scrubbing media may be used, which are preferably particulate materials; for example crushed coke, stone, ash, charcoal, coke and other media to which tars and contaminants will attach, react or be absorbed.

The general form of the scrubbing system (referred to herein sometimes simply as a scrubber) is shown in FIG. 1. It consists of an upper assembly 42 and a lower assembly 44. All of the assembly components may be made of material which is not subject to attack, for example stainless steel (e.g. type 304). The upper and lower subassemblies 42 and 44 may be welded out of plates and tubes of stainless steel.

The upper assembly 42 has a gas water inlet duct 46 with a forward flange 48 on which the spray cooler 24 (FIG. 13) may be mounted The spray cooler may be well off the ground since the scrubber may be approximately 12 feet high.

The duct 46 leads into an annular chamber 50 (FIGS. 2 and 3) which serves as a plenum for the inlet stream of gas and water. This chamber leads to an injector or probe tube 52 which carries the gas and water down through a column 54 of the scrubbing media, which may be the granular char from the gasifier 14 (FIG. 13). The injector tube is closed at the upper end 56 and open at the lower end 58 thereof. Four ducts 60 provide the inlet for the gas-water stream into the probe, the opening at the lower end 58 of the duct provides an outlet for the water in the gas water stream. An outlet for the gas is provided by a screen 62. The screen 62 is for example made up of 3/16 inch diameter stainless steel rods welded together with 1/16 inch spacing. The screen is an integral part of the injector tube 52.

The duct 46 has an access hole on which a cover 64 is mounted. The chamber also has access holes closed by covers 86. Surrounding the chamber 50 is a plenum 68. This plenum is in two sections, namely an upper section 70 and a lower section 72 which are separated by a plate 74 having a number of holes 76 through which the upper and lower sections are in communication (see FIG. 3). The gas outlet from the plenum is provided by a riser, 80 is shown in FIG. 2. This riser has a flange 84.

The upper section contains a bin or magazine provided by a tubular member 90. The top of this tubular member is bolted to the cover plate 78 having the access holes which are closed by the covers 66. Rising from this plate 78 is the upper char inlet tube 81. This tube is closed at the top 83 thereof. A peripheral entrance hole 85 receives a tube 87 through which a feed auger 87 extends (see FIG. 9).

The upper assembly is completed by a tubular structure 94 which is the lower end of the upper assembly. The tubular structure is connected to a ring bracket 96 which is "L" shaped (like an angle iron in cross section) as shown in FIG. 2. This bracket is bolted or clamped to an upper plate 98 of the lower assembly 44. Clamping is preferred since then the upper assembly can be rotated so as to align the duct 46 and the outlet riser 80 with other parts of the system.

Figure 2A:
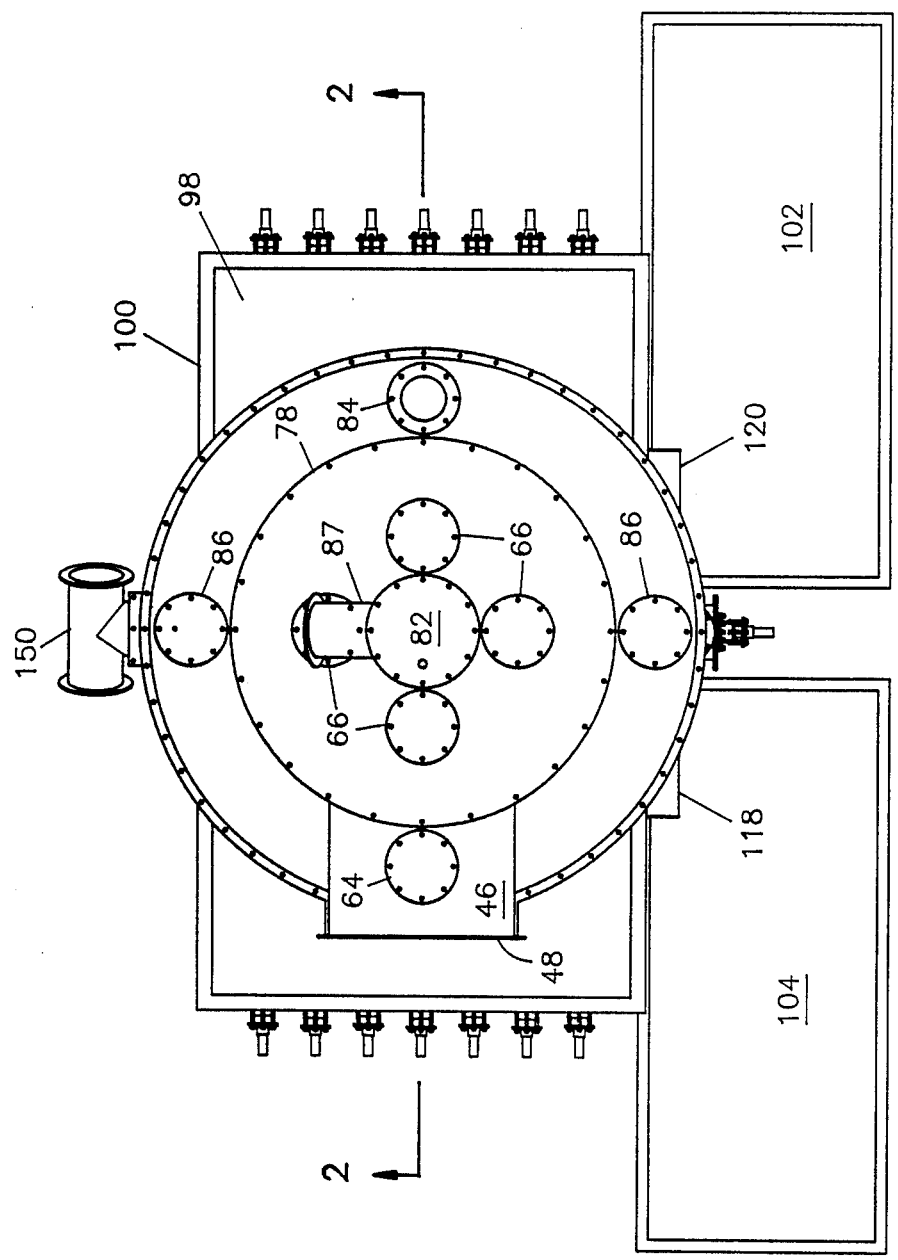
FIG. 2A is a top view of the system shown in FIG. 1.
Figure 3:
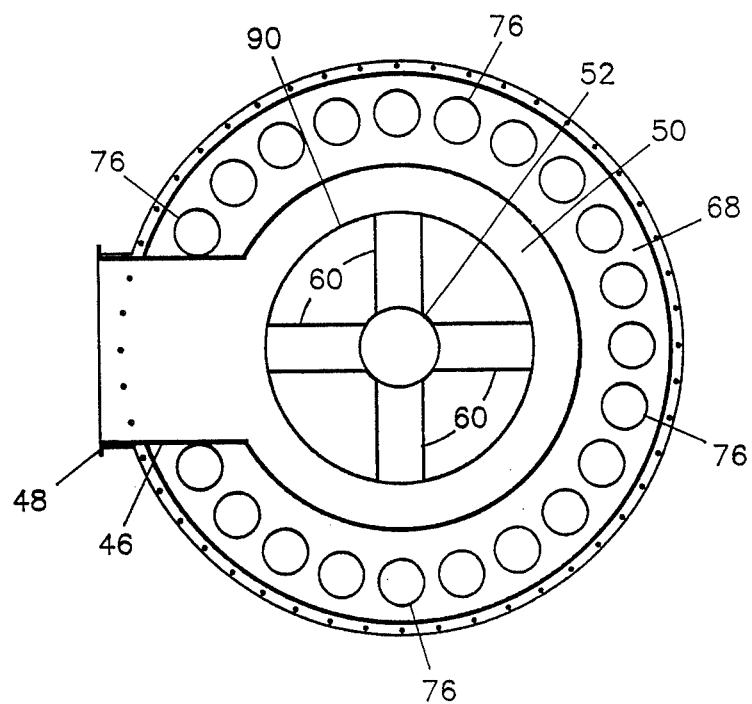
Figure 4:
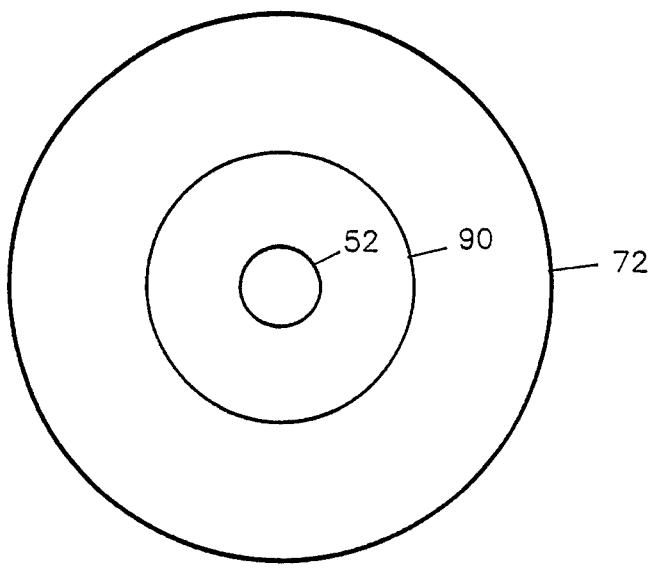
Figure 5:
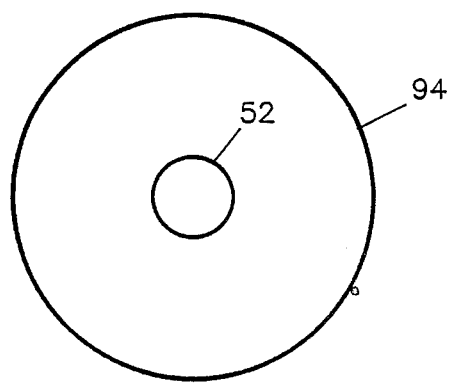
Figure 6:
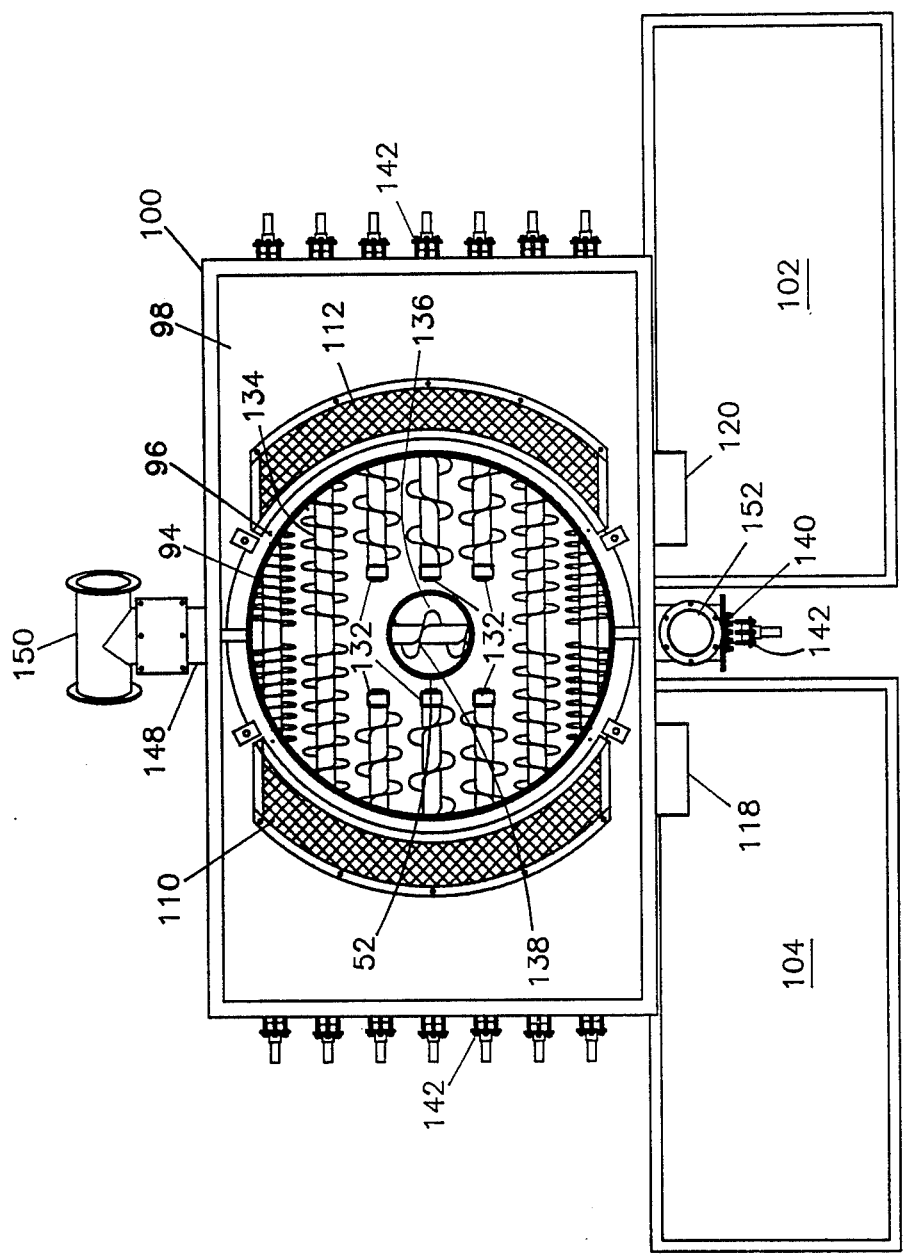
Figure 7:
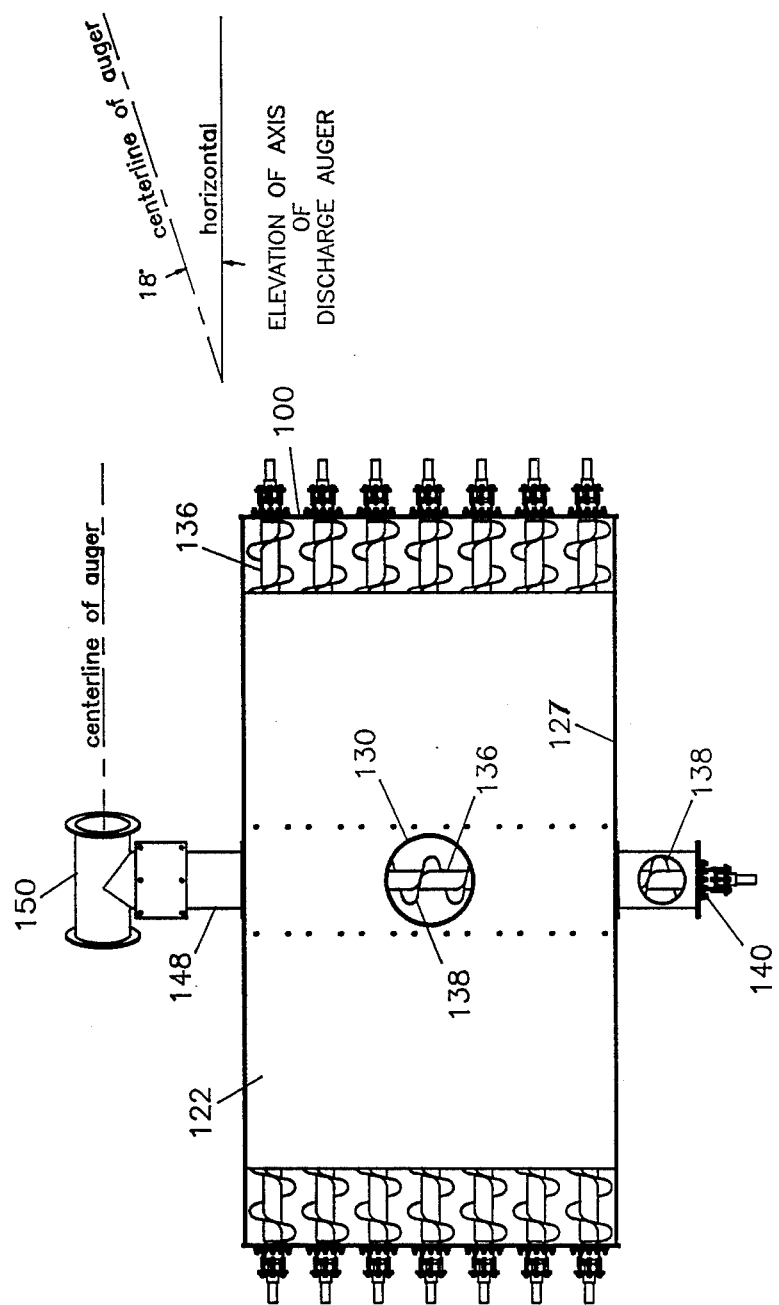

The lower assembly has as its major constituent a tank 100. This tank is associated with settlement tanks 102 and 104 which are shown in dash line in FIG. 8 and in solid lines in FIGS. 2A and 6. The tanks are not shown in FIGS. 1 & 7 in the interest of clarity of presentation. The tanks and the entire scrubber 16 rest on a support structure 106 having legs and cross braces. The cross structure may be mounted to the floor or rest on a pad (preferably a sturdy concrete pad) in the ground.

The water level in the tank 100 is indicated at 108 in FIG. 2. This level is below the gas injection screen 62 and above the lower end 58 of the injection tube 52. A plate 98 confines the char (or other lighter than water scrubbing media) in the tank below water level and prevents the char from floating since it is lighter than water. The plate has screens 110 and 112 bolted thereto (see FIG. 6). The water rises through these screens and reaches its level 108. The level is set by wiers 114 and 116 which are vertically adjustable (see FIG. 1). These wiers may be mounted at the ends of extensions 118 and 120 which extend over the settlement tanks 102 and 104.

A partition plate 122 (see FIG. 7 and FIG. 2) is welded along its edges 124 and 12 and is equal in width to the width of the tank but is shorter in length than the length of the tank 100. The partition plate 122 divides the tank into upper and lower sections 126 and 128. Centrally of the plate 122 and extending upwardly therefrom is a collar 130. The lower end of the injector tube 52 is nested in the collar. The side ends of the upper and lower sections 126 and 128 are in communication with each other since the partition plate 128 is shorter in length than the tank.

Hanger brackets 132 extend upwardly from the partition and downwardly below the partition. These hanger brackets contain bushings for receiving the ends of central augers in upper and lower auger arrays 134 and 136. The central augers of these arrays have their inner ends journaled in the bushings in the hanger brackets 132 so as to be clear of the injector tube 52 and collar 130 and also to be clear of the outlet region 136 through which the spent char passes. The spent char is discharged by a discharge auger 138. The augers in the array and the discharge auger are all held at the outer ends thereof (where drive shafts extend for connection to suitable drive shafts or gearing (not shown)) by clamp plates 140 having packing assemblies 142.

The discharge auger 138 extends through a pipe 146 extending outwardly from the front of the tank 100 and another pipe 148 which extends outwardly from the rear of the tank 100. A journal assembly 150 in the rear pipe 148 mounts the rear end of the auger 138 and is connected to a char discharge T 150. This T is angled upwardly so that the char discharges above the water level 108. The forward pipe 146 is connected to a vertical stand pipe 152 which also extends above the water level 108. Sludge and water in the settlement tanks 102 and 104 may be pumped from these tanks into the stand pipe 152 for recycling or disposal. The tanks may be cleaned separately with one tank remaining in service while the other is cleaned.

The auger array 134 in the upper section 126 of the tank is pitched 180° out of phase with the auger array 128 in the lower tank section 128. Alternatively, the augers in the upper array may be turned in a direction opposite to the augers in the lower array. For uniform flow of the char through the tank it is desirable that the pitch of the augers closer to the front and rear walls 124 and 126 of the tank have a smaller pitch (flights closer together as shown in FIG. 11) or be driven at greater speed.

In operation, the fresh char enters the magazine section of the upper assembly 42 defined by the tubular structure 90 and fills the upper assembly and lower assembly up to the partition 122 with a column of char. The char forms cones at the top of the magazine structure 90 and in the lower plenum section 72. The char is then circulated by the auger array 134 in the upper section 126 outwardly to the side ends of the tank. Circulation is continued, under the force supplied by the auger array 136 in the lower section 128 of the tank, laterally inward to the discharge region 136. There the discharge auger 138 conveys the char to the rear outlet pipe 148 and thence to the "T" 150. One side of the T may be closed by a packing gland and auger drive and the other side connected to an auger or other conveyor system for returning the spent char to the biomass input (hopper 10 shown in FIG. 13).

The gas and water stream to the scrubber enters the injector tube 52 through the cross ducts 60. The gas is exhausted through the screen 62 while the water continues into the tank. The gas flows upwardly in a direction opposite to the flow of the char in the column. It will be understood that the char flows downwardly under the force of gravity as it is discharged through the spent char outlet defined by the region 136 and the discharge pipe 148 and "T" 150. There is a head (a weight) of char in the column above the openings into the plenum lower section 72. In other words the gas exits at the perimeter of the column below the top of the column. This precludes the gas from flowing upwardly around the injection pipe 52. The gas velocity should be sufficiently low to preclude fluidizing of the char in the column. The cleanest char is in the upper part of the column. Accordingly, the gas moves progressively through cleaner and cleaner char containing regions of the column 54 and the cleanest gas contacts the cleanest char at the exits from column into the lower section 72 of the plenum 68. This assures stripping of tar and other contaminants.

To the extent that the gas contains water vapor, upon contact with the cool char the vapor condenses and the resulting liquid flows downwardly into the tank. This is a minor portion of the liquid. The majority of the liquid exits through the lower end 58 of the injection tube because it has already condensed as it travels down through the injection tube which is surrounded by cool char. In other words, condensation on the inner wall of the injection tube 52 occurs. The tar and otherwise contaminated water then flows upwardly in a direction opposite to the flow of the char which is produced by the auger arrays 134 and 136. In other words, the water and the char are in counterflowing relationship in the tank. The flow occurs underwater since the char in the tank is retained underwater by the plate 98. Like the gas, the water contacts the dirtiest char first and then continues to contact progressively cleaner char until it contacts the cleanest char in the tank before being discharged through the screens 112 from the char containing areas of the tank 100.

Accordingly, tars and other contaminants are stripped both from the gaseous and from the liquid components of the inlet stream which enters the duct 46. The clean gas is removed at the outlet riser 80 and the water is allowed to flow into the settlement tanks through the wiers 114 and 116 which set the water level.

Referring to FIGS. 10-12 there is shown a scrubber 16A which is adapted to operate with heavier than water scrubbing media, such as heavier chars than are used in the embodiment shown in FIGS. 1-9. Such heavier than water chars are produced, e.g. by gasifying oil shale, lignite, or peat. The scrubber 16A has an upper assembly 200 and a lower assembly 202. The upper assembly 200 is similar to the upper assembly 42 of the scrubber 16. Like parts of the upper assembly are identified by like reference numerals to those used in connection with the embodiment of FIGS. 1-9. The lower section 202 is provided by a tank 204 and is supported on a braced leg support structure 206. The tubular section 202 extends to the bottom of the tank 204 and has diametrically opposite openings 210 and 211 equipped with screens 240 and 242. These screens are received in Y-shaped fingers 208 which are spaced from each other around the bottom of the tank.

Suspended below the bottom of the tank, where the cylinder 202 terminates, is a lower tank section 212 which is generally rectangular in shape and which contains in the bottom thereof a trough 214. The section 212 contains an array of augers 216. The augers closer to the front and rear walls 220 and 222 are of closer pitch than the augers which are closer to the center of the tank (directly below the injection tube 52). Each of the augers in the array has two parts on opposite sides of the center line of the tank which extends between the front and rear walls 220. This center line also is the center of the trough 214. The flights of the augers are 180° out of phase in the sections so that the augers circulate the char in the column 50 from the periphery of the column inwardly towards the trough 214.

In the trough 214 is a discharge auger 226, which extends into a front pipe 228 and a rear pipe 230. The rear pipe is terminated in a "T" 232 which is angled upwardly. A stand pipe 234 extends upwardly from the forward pipe 228 through which the auger 226 extends. The auger 226 is driven in a direction to discharge the spent char to the outlet "T" 232. The outlet T is angled upwardly as was the case with the outlet T 150 (see FIG. 8) so that the char discharge is above the level 340 of the water in the tank 204. The stand pipe 234 also rises above the level 340 of the water. The stand pipe may be used for clean out and the discharge auger and "T" to remove the spent char in the same manner, as described in connection with the embodiment shown in FIGS. 1-9. The discharge auger 226 may have a variable pitch, increasing towards the discharge end at the T 232 for uniformity in flow of the spent char out of the scrubber 16A.

The screens 240 and 242 provide passages for the liquid which exits through the lower end 58 of the injector tube 52 into settlement tank regions 244 and 246 of the tank 204. These regions may have baffle plates 248 and 250 therein. Still further outward towards the side ends of the tank are overflow sections 252 and 254 having wiers 256 and 258 therein. These wiers allow spillover of liquid above the level 340 of water in the tank 204 into discharge tanks 256 and 258. These discharge tanks have exit ports 260 and 262 at the bottom thereof.

In operation char, is continuously fed through the inlet auger into the top of the magazine 90 and fills the column 54. Char is retained in the bottom of the column by the screens 240 and 242. The augers of the auger array 216 and the discharge auger continuously remove the spent char from the bottom of the column and char column flows downwardly under the force of gravity, continuously. The gaseous component of the gas-water stream exits through, the screen 62 and is scrubbed as it contacts the column in counterflowing relationship. The scrubbing of the gas occurs above water level 340 and contact is made with gradually cleaner gas contacting cleaner char until the cleanest gas contacts the cleanest char at the exit into the lower section 72 of the plenum 68. There is always a head of char above the exit to prevent backup around the injection tube 52. The water which flows down in the injection tube, 52 and which passes out the lower end 58 of the injection tube then flows laterally through the downwardly moving column of char 54 and out the screens 240 and 242 into the settlement tank regions 244 and 246. The clean water rises to the level 340 and flows into the tank sections 252 and 254 where the level is set by the wiers 256 and 258. The clean water is then discharged through the outlet ports 260 and 262.

From the foregoing description it will be apparent that there has been provided improved gas liquid scrubbing apparatus and systems for gasification using such apparatus. While presently preferred embodiments of these system and scrubbers have been described, it will be appreciated that variations and modifications thereof, within the scope of the invention will undoubtedly suggest themselves to those skilled in the art. Accordingly, the foregoing description should be taken as illustrative and not in a limiting sense.

We claim:

1. A system for scrubbing gas produced by a gasifier which also produces char which system comprises means for separating said gas and char, means for scrubbing said gas with said char, said scrubbing means having a char inlet and a spent char outlet and a gas inlet and a clean gas outlet, means for delivering said gas and said char from said separating means to said scrubbing means, said scrubbing means comprising means for providing a flow of said char from said char inlet to said spent char outlet, and means for providing a flow of said gas from said gas inlet to said clean gas outlet through said char.

2. The system according to claim 1 further comprising means for delivering said spent char to said gasifier for further gasification therein.

3. The system according to claim 1 wherein said flow providing means has means for causing flow of said gas through said char in counterflowing relationship.

4. The system according to claim 3 wherein said flow causing means comprises means for providing an entrance for said gas into said char downstream from said char inlet whereby said gas contacts clean char as it progresses therethrough with the cleanest gas contacting the cleanest char in the scrubbing means.

5. The system according to claim 1 further comprising means for combining water with said gas before it is delivered to said gas inlet of said scrubbing means, and means in said scrubbing means for providing a path through said char where said water contacts said char and is scrubbed.

6. The system according to claim 5 wherein said scrubbing means has means in communication with said outlet for containing said char as it flows to said outlet and collecting said water which passes through said char.

7. The system according to claim 6 further comprising means in said char containing and water collecting means for causing the water to flow through said char in said containing and collecting means in counterflowing relationship.

8. The system according to claim 7 wherein said water flow causing means includes means for contacting said water first with the char closest to said spent char outlet whereby the cleanest water contacts the cleanest char in said containing and collecting means.

9. The system according to claim 8 further comprising means for cooling said char before delivery to said char inlet.

10. A system for scrubbing a fluid having a gaseous component and containing contaminants to remove the contaminants therefrom which system comprises means for providing a body of scrubbing media having particles in contact in which flow of said media occurs between a fresh media inlet and a spent media outlet, means for passing said fluid through said media in counterflowing relationship therewith, said fluid passing means having an inlet through said media body closer to said media outlet then to said inlet whereby the cleanest gaseous component and the cleanest media in said body contact each other, said fluid containing said gaseous component and a liquid componet, means in communication with said spent media outlet for containing a portion of said media body and collecting said liquid, and means for passing said liquid in counterflowing relationship with said media in said containing and collecting means.

11. The system according to claim 10 further comprising means in said containing and collecting means for providing a flow path for said media having an entrance closer to said media inlet than to said spent media outlet and an exit closer to said spent media outlet than to said media inlet, and means for passing said liquid through said media in a direction from said exit to said entrance whereby the cleanest liquid contacts the cleanest media.

12. A system for scrubbing a fluid having a gaseous component and containing contaminants to remove the contaminants therefrom which system comprises means for providing a body of scrubbing media having particles in contact in which flow of said media occurs between a fresh media inlet and a spent media outlet, means for passing said fluid through said media in counterflowing relationship therewith, said fluid passing means having an inlet through said media body closer to said media outlet then to said inlet whereby the cleanest gaseous component and the cleanest media in said body contact each other, said body providing means comprising means for providing a vertical column of said media having a top and a bottom with an opening centrally thereof and having an upper end and a lower end, said lower end being spaced from the bottom of said column below said fluid passing means inlet, means for providing the fresh media inlet at the top of said column, means for providing said spent media outlet at the bottom of said column, said means for providing the flow of said media including means for providing for the passage of said media through said outlet so as to enable flow of said media in response to gravity, and said means for passing said fluid in counterflowing relationship with the flow of said media comprising said opening in said column having said lower end spaced from the bottom of said column, and means disposed around the periphery of said column near the top thereof which provides an outlet for the gaseous component of said fluid.

13. The system according to claim 12 wherein said means disposed about the periphery of said column includes a plenum having an opening in communication with said column.

14. The system according to claim 13 wherein said means for providing said fresh media inlet includes a pipe over the top of said column, and means defining a magazine on top of said column into which fresh media is fed through said pipe.

15. The system according to claim 14 wherein said opening centrally of said column is defined by a vertically extending tube, at least one duct extending laterally through said column into said tube's upper end.

16. The system according to claim 12 wherein said fluid also has a liquid component, means defining a tank into which the bottom of said column extends, said central opening extending into said tank such that the lower end thereof is within said tank and provides an inlet for said liquid component from said column into said tank which liquid is contained in and can rise to a certain level in said tank, and an opening in said central opening above said level for providing the periphery of said inlet for said gaseous component into said column.

17. The system according to claim 16 wherein said tank has side ends, a partition therein extending laterally of said tank and spaced vertically above the bottom of said tank, said partition separating said tank into upper and lower sections said bottom of said column terminating at said partition, said partition having an opening in alignment with the central opening of said column at the lower end of said central opening such that said inlet for said liquid component is into said lower section, said upper and lower sections having opposite side ends and being in communication at said opposite side ends thereof, and means for circulating said media from the bottom of said column laterally outwardly of said column to the side ends of said upper section and laterally inwardly through said lower section from said side ends thereof, said sections defining a passage for the liquid component of said fluid from said lower end of said central opening through said lower sections and then through said upper section in counterflowing relationship with the flow of said media therein, said spent media outlet be disposed in communication with said lower section and laterally inwardly from said side ends thereof.

18. The system according to claim 17 wherein said circulating means comprises first and second arrays of augers extending laterally of said first and second sections, and the discharge auger in said spent media outlet.

19. The system according to claim 17 further comprising a plate extending laterally across and defining the top of said upper section, screen means in said plate for the passage of said liquid, and means above said plate for discharging said liquid collected in said tank.

20. The system according to claim 16 wherein said tank has a portion which extends laterally at least to one side of said column, a screen in the periphery of said column separating said column from said tank portion, means providing for the flow of liquid above said level from said tank portion, said spent media outlet being disposed at the bottom of said column in said tank, and means at the bottom of said tank adjacent to said spent media outlet for feeding said media into said spent media outlet.

21. The system according to claim 20 wherein said feeding means comprises an array of augers in said tank extending laterally across the bottom of said column, and said spent media outlet including a trough extending in a direction transverse to said augers, and a discharge auger in said trough.

* * * * *